US010115393B1

(12) United States Patent
Kumar et al.

(10) Patent No.: US 10,115,393 B1
(45) Date of Patent: Oct. 30, 2018

(54) REDUCED SIZE COMPUTERIZED SPEECH MODEL SPEAKER ADAPTATION

(71) Applicant: Microsoft Technology Licensing, LLC, Redmond, WA (US)

(72) Inventors: Kshitiz Kumar, Redmond, WA (US); Chaojun Liu, Kirkland, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/339,464

(22) Filed: Oct. 31, 2016

(51) Int. Cl.
| | | |
|---|---|---|
| *G10L 15/16* | (2006.01) | |
| *G10L 15/07* | (2013.01) | |
| *G10L 15/06* | (2013.01) | |

(52) U.S. Cl.
CPC ............ *G10L 15/07* (2013.01); *G10L 15/063* (2013.01); *G10L 15/16* (2013.01)

(58) Field of Classification Search
CPC ......... G10L 15/16; G10L 15/083; G10L 5/30; G10L 25/30; G06F 25/30
USPC ................................ 704/232, 243, 246, 256
See application file for complete search history.

(56) References Cited

U.S. PATENT DOCUMENTS

| 5,806,034 A * | 9/1998 | Naylor ................... G10L 15/144 |
| | | 704/238 |
| 2009/0006093 A1 * | 1/2009 | Das ......................... G10L 17/10 |
| | | 704/246 |
| 2011/0276323 A1 * | 11/2011 | Seyfetdinov ............ G06F 21/32 |
| | | 704/207 |
| 2012/0116767 A1 * | 5/2012 | Hasdell .................. G10H 1/361 |
| | | 704/254 |
| 2014/0142942 A1 * | 5/2014 | Chong .................. G10L 15/063 |
| | | 704/243 |
| 2014/0257803 A1 | 9/2014 | Yu et al. |
| 2014/0257805 A1 | 9/2014 | Huang et al. |
| 2014/0372112 A1 | 12/2014 | Xue et al. |
| 2015/0170020 A1 | 6/2015 | Garimella |
| 2015/0193431 A1 * | 7/2015 | Stoytchev ............... G06F 19/18 |
| | | 704/9 |
| 2015/0255061 A1 | 9/2015 | Xue et al. |

(Continued)

OTHER PUBLICATIONS

Kumar, et al., "Non-Negative Intermediate-Layer Dnn Adaptation for a 10-Kb Speaker Adaptation Profile", In Proceedings of 41st IEEE International Conference on Acoustics, Speech and Signal Processing, Mar. 20, 2016, pp. 5285-5289.

(Continued)

*Primary Examiner* — Jakieda Jackson
(74) *Attorney, Agent, or Firm* — Jared S. Goff; Goff IP Law PLLC

(57) ABSTRACT

A computer-readable speaker-adapted speech engine acoustic model can be generated. The generating of the acoustic model can include performing speaker-specific adaptation of one or more layers of the model to produce one or more adaptive layers comprising layer weights, with the speaker-specific adaptation comprising a data size reduction technique. The data size reduction technique can be threshold value adaptation, corner area adaptation, diagonal-based quantization, adaptive matrix reduction, or a combination of these reduction techniques. The speaker-adapted speech engine model can be accessed and used in performing speech recognition on computer-readable audio speech input via a computerized speech recognition engine.

20 Claims, 8 Drawing Sheets

(56) References Cited

U.S. PATENT DOCUMENTS

2015/0310862 A1    10/2015  Dauphin et al.
2016/0086599 A1*   3/2016   Kurata .................. G10L 15/063
                                                      704/243
2017/0169815 A1*   6/2017   Zhan .................... G10L 15/075

OTHER PUBLICATIONS

Fan, et al., "Unsupervised Speaker Adaptation for DNN-Based TTS Synthesis", In Proceedings of 41st IEEE International Conference on Acoustics, Speech and Signal Processing, Mar. 20, 2016, pp. 5135-5139.

Wang, et al., "Small-Footprint High-Performance Deep Neural Network-Based Speech Recognition Using Split-VQ", In Proceedings of 40th International Conference on Acoustics, Speech and Signal Processing, Apr. 19, 2015, 5 pages.

Xue, et al., "Speaker Adaptation of Hybrid NN/HMM Model for Speech Recognition Based on Singular Value Decomposition", In Proceedings of 9th International Symposium on Chinese Spoken Language Processing, Sep. 12, 2014, pp. 1-5.

Miao, et al., "Towards Speaker Adaptive Training of Deep Neural Network Acoustic Models", In Proceedings of 15th Annual Conference of the International Speech Communication Association, Sep. 14, 2014, 5 pages.

Swietojanski, et al., "Learning Hidden Unit Contributions for Unsupervised Speaker Adaptation of Neural Network Acoustic Models", In Proceedings of IEEE Spoken Language Technology Workshop, Dec. 7, 2014, 6 pages.

Xue, et al., "Singular Value Decomposition Based Low-Footprint Speaker Adaptation and Personalization for Deep Neural Network", In Proceedings of International Conference on Acoustics, Speech and Signal Processing, May 4, 2014, 5 pages.

Ochiai, et al., "Speaker Adaptive Training Using Deep Neural Networks", In Proceedings of International Conference on Acoustics, Speech and Signal Processing, May 4, 2014, pp. 6399-6403.

Zen, et al., "Fast, Compact, and High Quality LSTM-RNN Based Statistical Parametric Speech Synthesizers for Mobile Devices", In Journal of Computing Research Repository, Jun. 2016, pp. 1-14.

Hinton, et al., "Deep Neural Networks for Acoustic Modeling in Speech Recognition", In Journal of IEEE Signal Processing Magazine, Nov. 2012, pp. 1-27.

Mohamed, Abdel-Rahman, "Deep Neural Network acoustic models for ASR", In Thesis of University of Toronto, Apr. 2014, 129 pages.

* cited by examiner

REDUCED SIZE COMPUTERIZED SPEECH MODEL SPEAKER ADAPTATION

BACKGROUND

In speech recognition, input data representing speech has been processed using models, which are computer-readable data structures used by computer systems in processing speech signals. For example, input speech may be processed to produce features, which can be processed by a speech recognition engine using an acoustic model, a word lexicon (or pronunciation model), and a language model. Different structures have been used for acoustic models. For example, an acoustic model may be a deep neural network, which is a network having multiple layers that are used to process input speech audio features. Each such layer may be in the form of a matrix of weights, which are used to operate on a vector of audio features. The layers can be used in a series of operations, such as with the output of an operation using a first layer being used as input to an operation using a second layer. In some models, a layer may be decomposed into a pair of matrices (such as using single value decomposition), where an operation on the pair of matrices can yield a single matrix of the layer. In processing speech, an operation may be performed on the input data using the first matrix of the pair to produce an intra-layer output, and another operation can be performed on that intra-layer output using the second matrix of the pair to produce the output from the layer.

Acoustic models have been adapted to a speaker to form a speaker-dependent adapted model. For example, weights of an adaptive layer of an acoustic model have been modified using training data from a speaker (input audio speech data). The resulting speaker-dependent model can be used for recognizing speech that is indicated to be from that speaker (such as where the speech input is from the same user profile as the speech input used for adapting the speaker-dependent model).

Compression techniques have been used in speech recognition, with such techniques including non-negative compression (where non-negative values are set to zero), and quantization, which is a process of converting a range of input data values into a smaller set of output values that approximates the original data, such as where multiple value ranges are defined and all values within each such range are converted to the same discrete value (e.g., all values between 0.5 and 1.5 are converted to the value 1, etc.).

SUMMARY

Tools and techniques discussed herein relate to reducing the size of acoustic models that are adapted to a speaker for speaker-dependent speech recognition. Such tools and techniques may include one or more of the following, which are discussed in more below: threshold value adaptation, corner area adaptation, diagonal-based quantization, and adaptive matrix reduction. Each of these is discussed in more detail below.

In one aspect, the tools and techniques can include generating a computer-readable speaker-adapted speech engine acoustic model, which may include a deep neural network. The generating of the acoustic model can include performing speaker-specific adaptation of one or more layers of the model to produce one or more adaptive layers comprising layer weights, with the speaker-specific adaptation comprising a data size reduction technique. The data size reduction technique can be threshold value adaptation, corner area adaptation, diagonal-based quantization, adaptive matrix reduction, or a combination of these reduction techniques. The resulting speaker-adapted speech engine model can be accessed and used in performing speech recognition on computer-readable audio speech input via a computerized speech recognition engine.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
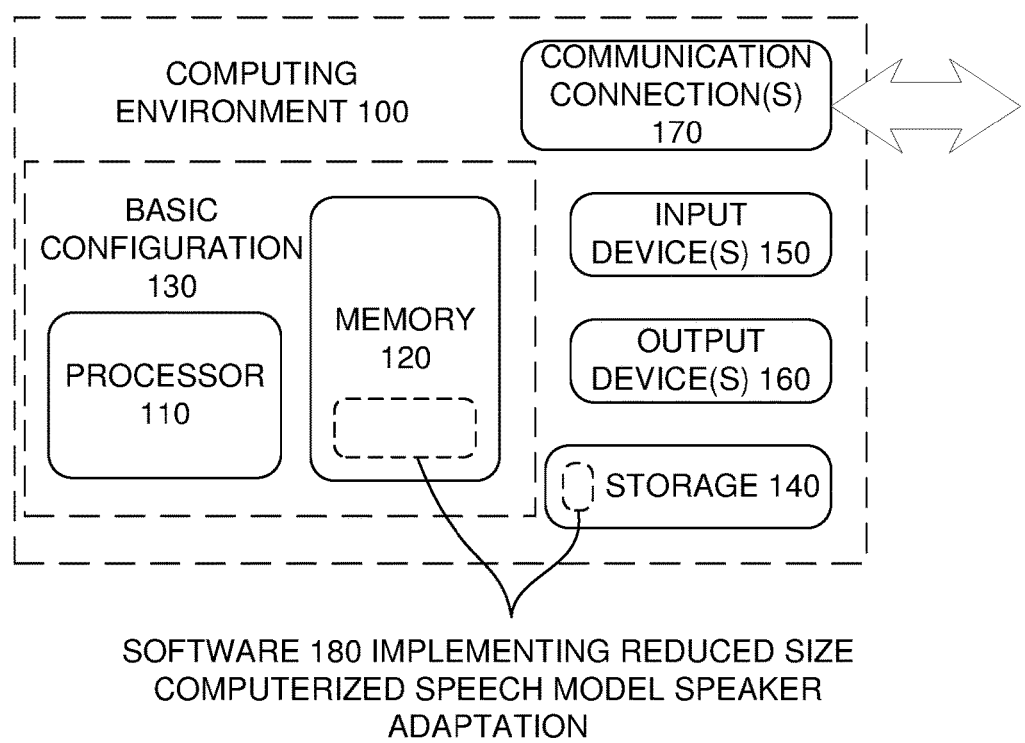
FIG. 1 is a block diagram of a suitable computing environment in which one or more of the described aspects may be implemented.

Aspects described herein are directed to techniques and tools for improvements in computerized speech recognition, and specifically to tools and techniques for reduced-size speaker-dependent acoustic models. Improvements may result from the use of various techniques and tools separately or in combination.

Such techniques and tools may include applying speaker adaptation for acoustic models, such as deep neural network (DNN) models, in a layer adaptation framework, where one or more of the layers in the model (such as one or more intermediate layers) can be adapted. The model can include decomposed layers, such as singular value decomposition (SVD) layers. The technique can include inserting a new layer (such as a new linear layer) on top of an SVD layer of a general DNN model and adapting the inserted layer, so that the inserted layer is speaker-dependent. This speaker-specific adaptation of the adaptive layer can be done in a supervised method, where the transcription of speaker-specific speech is available. Alternatively, the adaptation can be done in an unsupervised approach, where the transcription is inferred from a production speech recognition system. Furthermore, a number of filters may be applied based on utterance confidence, no. of words in the utterance, etc., to select higher quality data for the adaptation. The resulting adapted model, which can include the general model along with one or more speaker-dependent adapted layers, can be used in a runtime speech recognition system to recognize words from speech input.

One or more constraints can be applied to an adaptation layer to compress the size of the speaker-dependent weight parameters, while retaining accuracy benefits of adaptation. Some of the constraints can include threshold value adaptation, corner area adaptation, diagonal-based quantization, and/or adaptive matrix reduction. As indicated, each of these may be used by itself, or in any combination with the other constraints.

Adaptive matrix reduction refers to the technique for inserting a speaker-dependent adaptive matrix into an adaptive layer of a model, such as a DNN model. The adaptive matrix has fewer weights than the overall adaptive layer. For example, the adaptive layer may be a layer that represents a 2000 by 2000 matrix of weights, but where the layer has been decomposed into a 100 by 2000 matrix of weights and a 2000 by 100 matrix of weights. The adaptive matrix can be a 100 by 100 matrix of weights inserted computationally between the two decomposed matrices (so that in utilizing the model, a computation is performed using the first decomposed matrix, followed by a computation being performed using the inserted matrix, followed by a computation being performed using the second decomposed matrix), so that the inserted adaptive matrix, which is adapted to be speaker-dependent, has fewer weights than the overall adaptive layer.

In threshold value adaptation, a set of adapted layer weights in the adaptive layer is compared to a threshold value. Threshold value adaptation also includes either constraining weights in the set of layer weights that are less than the threshold value to be a single target value, or constraining weights in the set of layer weights that are greater than the threshold value to be the single target value.

In corner area adaptation, a speaker-dependent adaptation is performed on weights in a top left corner matrix area of an adaptive matrix in the adaptive layer, without performing the adaptation on other areas of the adaptive matrix outside of the corner matrix area.

Diagonal-based quantization includes constraining to a first range and quantizing a set of diagonal weights of the adaptive layer, and constraining to a second range and quantizing a set of non-diagonal weights of the adaptive layer, with the first range being different from the second range (e.g., the first range may be a range that includes the value one, and does not include the value zero, while the second range may be a range that include the value zero, and does not include the value one).

The inventors have found that the use of these constraints can substantially reduce the amount of storage space used for each additional speaker-dependent acoustic model. Moreover, the inventors have found that this can be done without having significant adverse effects on accuracy of the speech recognition using the reduced-size speaker-dependent models. Indeed, where only small amounts of speaker-specific speech input are used to train the speaker-dependent model, it has been found that the constraints may even increase the accuracy of the resulting model in some circumstances, as compared to a model where the constraints are not used.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a computer in a speech recognition service, or as a client device that is configured to interact with such a service. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing reduced size computerized speech model speaker adaptation. An implementation of reduced size computerized speech model speaker adaptation may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
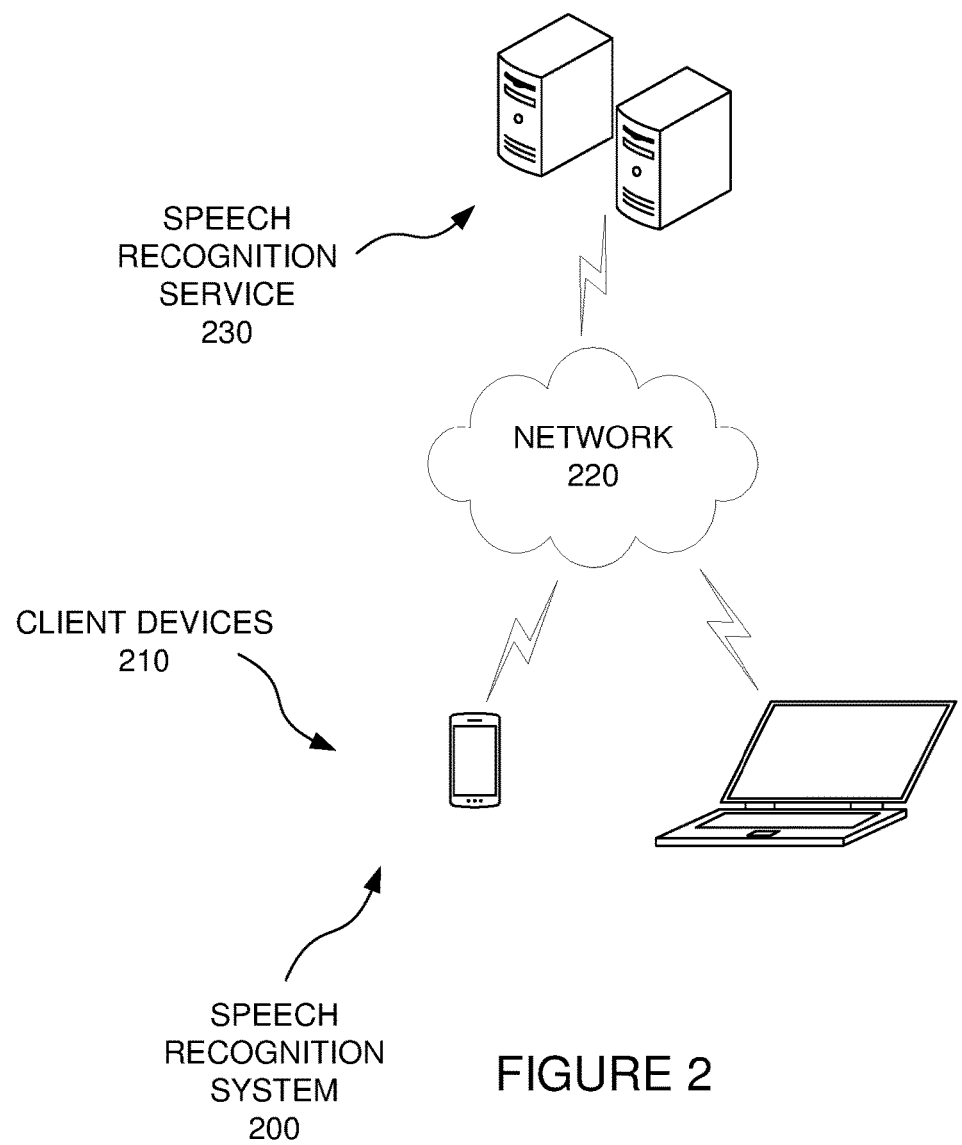
FIG. 2 is a schematic diagram of a speech recognition computer system.
Figure 3:
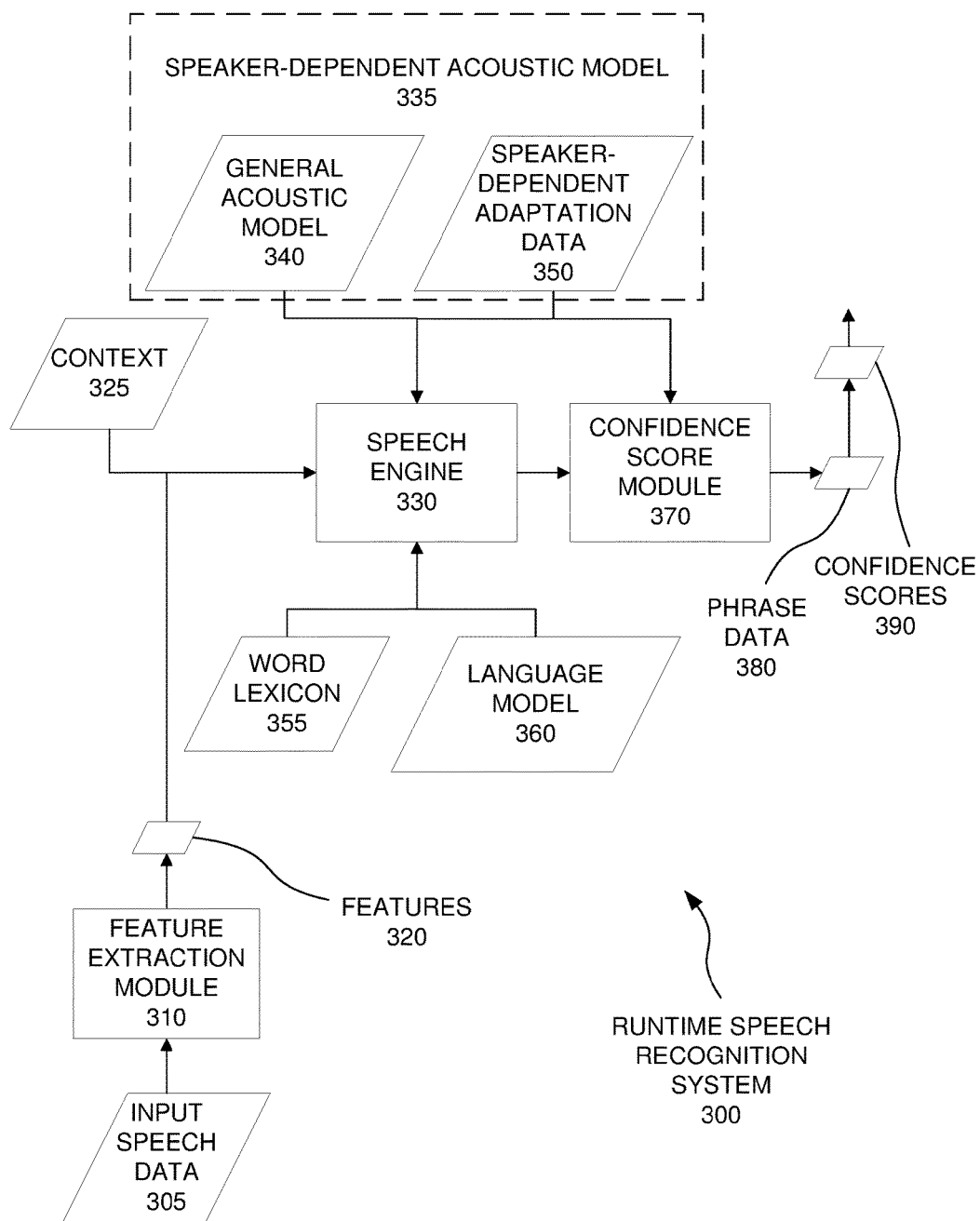
FIG. 3 is a schematic diagram of a runtime speech recognition system, which can be run in the components of the speech recognition computer system of FIG. 2.

II. Speech Recognition System and Environment
A. Overview of Speech Recognition System FIG. 2 is a schematic diagram of a speech recognition system (200) in conjunction with which one or more of the described aspects may be implemented. Components of the speech recognition system (200) are also illustrated in FIGS. 3-6.

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

Referring now to FIG. 2, components of the speech recognition system (200) will be discussed. Each of the components includes hardware, and may also include software. For example, a component of FIG. 2, 3, or 4 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

The speech recognition system (200) can include one or more client devices (210), which can communicate over a network (220) with a speech recognition service (230). The client devices (210) can receive user input speech, such as speech in the form of audio signals. Such audio signals can be coded via a client device (210) and/or a speech recognition service (230). The client devices (210) can also present data to users, such as in the form of visual presentations on a screen, audio played on a speaker, etc.

B. Runtime Speech Recognition System

The speech recognition system (200) can include a runtime speech recognition system (300), which can perform speech recognition on input speech data (305). Components of runtime speech recognition system (300) can be implemented one or more computer devices, such as in a speech recognition service (230) and/or in one or more client devices (210). The runtime system (300) can include a feature extraction module (310), which can analyze the input speech data (305) to produce features (320), which represent the input speech data (305), and which can be utilized in speech recognition. For example, the input speech data (305) may be in the form of digital or analog audio signals. For example, a user may speak into a microphone in a client device (210), and that client device may code the input speech into coded audio signals. The feature extraction module (310) can produce features (320), which can represent audio energy levels of the input audio signals for particular time periods and for particular frequencies within those time periods, according to known techniques. For example, such time periods may be 25 millisecond periods, and the frequency bands can be bands that are within the range of normal human speech. The features (320) and optionally additional context data (325) can be provided to the speech engine (330). The speech engine (330) can process the input features (320), and may also use the context data (325) to recognize the speech from the input speech data (305). Of course, such speech recognition may not be flawless, and will often have a certain number of errors.

In performing speech recognition, the speech engine (330) can use a speaker-dependent acoustic model (335) to recognize phonemes that match the features (320). In doing so, the speech engine (330) can perform operations on the features (320) using the speaker-dependent acoustic model (335). The features (320) may be in the form of a vector of audio energy values, and the acoustic model (335) can be in the form of a DNN having multiple layers, with each layer representing a matrix of weights, with operations (such as multiplication operations and/or non-linear operations) being performed on the features using the layers.

The acoustic model (335) can include a general acoustic model (340), which can be a DNN that has been trained using general speech training data, such as data from many different speakers, so that the general acoustic model (340) is not speaker-dependent (i.e., it is not specific to a particular speaker). However, the general acoustic model may be particular to a language, to a dialect of a language, etc. Such a general acoustic model (340) may be trained using a large amount of speech data, such as 10,000 hours of data. In such training, the words and phrases of the training data are recognized using the speech engine (330), the results are analyzed, and the weights of the general acoustic model (340) are adjusted to improve performance, such as to reduce errors when using the general acoustic model (340) to recognize speech. Such feedback training of the general acoustic model (340) can greatly reduce the error rates of the speech engine in recognizing speech. However, there are still differences in the speech of different individual human speakers. Accordingly, accuracy can be further increased by adapting a speaker-dependent acoustic model (335) to a particular speaker, which can be done by producing speaker-dependent adaptation profile (350).

The speaker-dependent adaptation profile (350) can be utilized in connection with the general acoustic model (340). Where the general acoustic model (340) is a DNN, the speaker-dependent adaptation profile (350) may be a modification of or an insertion into a portion of the general acoustic model (340). For example, the speaker-dependent adaptation profile (350) can be a modified version of one or more layers of the general acoustic model. For example, the general acoustic model (340) may have a single matrix of weights for one of its layers, and the speaker-dependent adaptation profile (350) may be a modified matrix of weights that is used in place of the corresponding layer of the general acoustic model (340) when processing features (320) for the corresponding speaker (such as for an identified user profile associated with the speaker). As another example, the speaker-dependent adaptation profile (350) may be a new matrix of weights that is inserted as an added layer of the general acoustic model (340) when processing features (320) for the corresponding speaker (such as for an identified user profile associated with the speaker). For example, the added layer matrix may initially be inserted as an identity matrix that is computationally between two layers of the general acoustic model (340), and that added matrix may be modified using training speech data specific to the particular speaker. As yet another example, if one of the layers of the general acoustic model (340) is a decomposed matrix, so that the layer is actually two smaller matrices, the speaker-dependent adaptation profile (350) may be inserted computationally between those smaller matrices. It can be desirable for the speaker-dependent adaptation profile (350) to be included in an intermediate layer of the general acoustic model (340) to form the speaker-dependent acoustic model (335). However, the speaker-dependent adaptation profile (350) may be included at an input layer or an output layer of the speaker-dependent acoustic model (335), or even at multiple layers.

The runtime speech recognition system (300) may store a single general acoustic model (340) for many speakers (such as a single general acoustic model for a natural language or natural language dialect), and may store a set of speaker-dependent adaptation profile (350) for each of many such speakers. Thus, if a user profile for a speaker is recognized, and the runtime speech recognition system (300) has speaker-dependent adaptation profile (350) for such a speaker, then the speech engine (330) can use the speaker-dependent adaptation profile (350) with the general acoustic model (340) in recognizing speech for that user profile. If the runtime speech recognition system (300) does not have access to speaker-dependent adaptation profile for a particular user profile (or no profile is recognized for the input speech), then the speech engine (330) can use the general acoustic model (340) for that speech, without using speaker-dependent adaptation profile (350).

The speech engine (330) can take the output from processing the features (320) for speech using the acoustic model (335), and can compare the pattern in the output to stored phoneme patterns, and can match the stored phoneme patterns to patterns formed by the output from the processing of the features (320) using the acoustic model (335). Accordingly, the speech engine (330) can identify a sequence of phonemes from the input features (320). Those phoneme sequences can be matched to phoneme sequences for words in a word lexicon (355), which can be computer-readable data that is accessed by the runtime speech recognition system. The speech engine (330) can compare the resulting sequence of matching words to phrases and/or computer-readable grammatical rules for the natural language in a language model (360). As a result of such matching, the words may be revised, or a single word may be chosen for multiple ambiguous words that could have matched a particular phoneme sequence. For example, if the input speech phrase is "there he goes," the phonemes for the first word may be corresponded to the words "their" or "there", or to the contraction "they're". The language model (360) can be used to recognize that the word "there" fits into the phrase without violating the language model and is the most likely word choice among the options.

The speech engine (330) can output the resulting sequence of words as phrase data (380) to a confidence score module (370), along with information about the processing of the features that resulted in the outputting of the identified sequence of words. The confidence score module (370) can produce confidence scores for the words in the sequence. For example, such confidence scores may be based upon quantifications of how well the results from processing using the acoustic model (335) matched the phoneme patterns, how well the resulting patterns of phonemes matched the chosen words in the word lexicon (355), and how well the sequence of words matched the language model (360).

C. Acoustic Model Adaptation System

Figure 4:
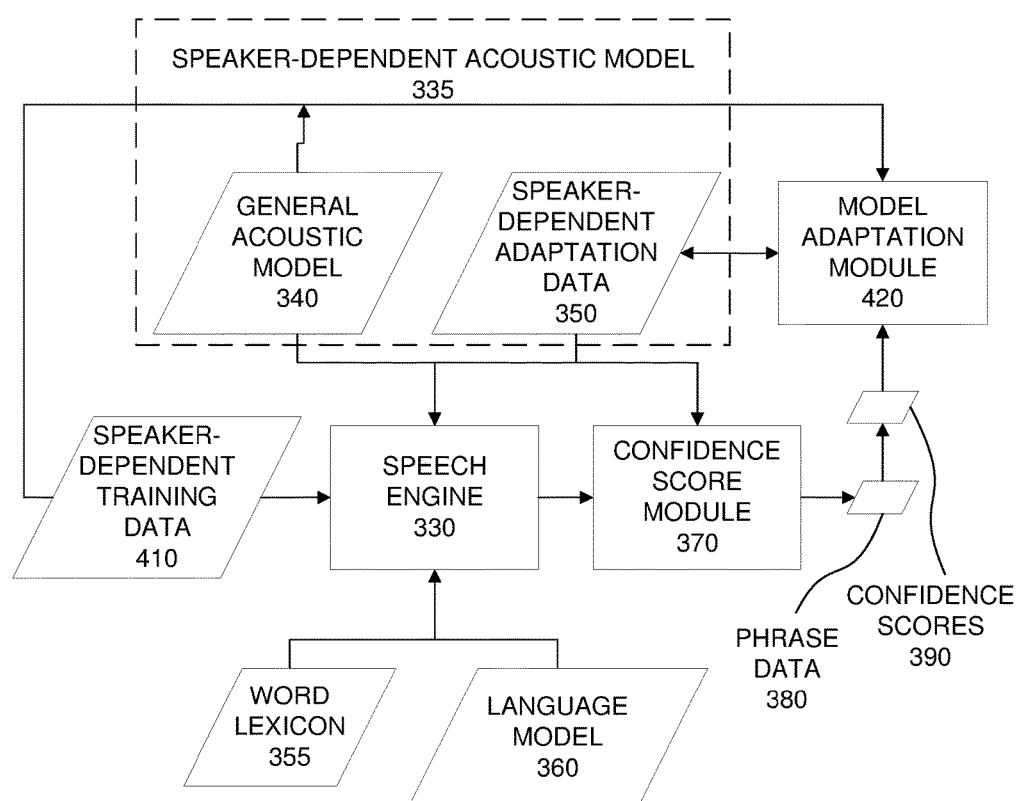
FIG. 4 is a schematic diagram of an acoustic model adaptation system, which can be run in the components of the speech recognition computer system of FIG. 2, and which can share components with the runtime speech recognition system of FIG. 3.

Referring now to FIG. 4, an acoustic model adaptation system (400) will be discussed. The acoustic model adaptation system (400) is a system that is configured to adapt the speaker-dependent acoustic model (335) to a particular speaker by adapting the speaker-dependent adaptation profile (350). It can adapt the speaker-dependent adaptation profile (350) in a manner similar to how the general acoustic model (340) is trained. However, the adapting of the speaker-dependent adaptation profile (350) may be performed with less training data. For example, the adapting of the speaker-dependent adaptation profile (350) may be performed with ten minutes of speaker-dependent training data (410) from a speaker, while the general acoustic model (340) may be trained with thousands of hours of data from different speakers. Many of the components from the runtime speech recognition system (300) can also be used in the acoustic model adaptation system (400), including the speech engine (330), the acoustic model (335), the word lexicon (355), the language model (360), and the confidence score module (370).

In adapting the speaker-dependent adaptation profile (350) to a particular speaker, the speech engine (330) can receive speaker-dependent training data (410). The speaker-dependent training data (410) can include features from actual speech, such as values representing audio energy levels for different periods of time and different frequency bands. The speech engine (330) can process the speaker-dependent training data (410) using the general acoustic model (340), the speaker-dependent adaptation profile (350), the word lexicon (355), and the language model (360). The speaker-dependent acoustic model (335) may initially produce the same results as the general acoustic model (340) alone, such as where the speaker-dependent adaptation profile (350) is initially one or more inserted identity matrices, or where the speaker-dependent adaptation profile (350) represents a modified version of one or more of the matrices of the general acoustic model (340) (which may be stored as differences from the values in the general acoustic model (340)). This processing can produce phrase data (380) from the speaker-dependent training data (410), and the confidence score module (370) can also produce confidence scores (390) for the words in the phrase data (380). The phrase data (380) and confidence scores (390) can be received by the model adaptation module (420).

The model adaptation module (420) can receive the results of the phrase data (380) and the confidence scores (390), as well as data representing differences between the output from the processing of the speaker-dependent training data (410) using the speaker-dependent acoustic model (335) and stored representations of ideal representations of the phonemes that were determined to be intended by the speech represented by the speaker-dependent training data (410). In doing so, some of the data may be filtered out, based on one or more factors, such as the data being associated with low confidence scores. The model adaptation module (420) can also access the speaker-dependent acoustic model (335) (such as by accessing the model in local and/or remote storage using standard data retrieval techniques), and can adjust the weights of the speaker-dependent adaptation profile (350) so that the output from the processing of the speaker-dependent training data (410) would have more closely matched the ideal stored reference representations of the phonemes corresponding to the speech that was recognized from the speaker-dependent training data.

This process of processing speaker-dependent training data (410) and adapting the speaker-dependent adaptation profile (350) can be repeated in an iterative manner using the speaker-dependent training data (410). For example, a portion of the available speaker-dependent training data (410) can be processed, the speaker-dependent adaptation profile (350) can be adapted by adjusting its weights, some additional speaker-dependent training data (410) can be processed using the newly-adapted speaker-dependent acoustic model (335), and the speaker-dependent adaptation profile (350) can again be adapted by adjusting its weights. This iterative process for adapting the speaker-dependent adaptation profile (350) to a particular speaker can be repeated until the available speaker-dependent training data (410) has been processed.

The adaptation may include filtering out some phrase data (380) from consideration in adapting the speaker-dependent adaptation profile (350), such as where such phrase data (380) has confidence scores (390) that are below a predetermined threshold value. Such a threshold value may be determined through testing, to produce a predetermined value, such as 0.2 for example (where confidence of 0 is no confidence and confidence of 1 is full confidence, and data for words with a confidence value below 0.2 is discarded from use).

Also, the adaptation may include re-applying a portion of the original matrix weights to keep the speaker-dependent acoustic model (335) from skewing results too far from results that would have been produced by the general acoustic model (340) without the speaker-dependent acoustic model. For example, if the speaker-dependent acoustic model is an inserted matrix that is originally inserted as an identity matrix, then a fraction of the identity matrix may be added in along with a fraction of the speaker-dependent acoustic model weights, as modified with each iteration of modifying the speaker-dependent adaptation profile (350). Such a technique can keep the results of the speaker-dependent acoustic model from straying too far from results that would have been obtained from the general acoustic model (340). This may be advantageous where the general acoustic model (340) has been trained with a much larger set of training data, so that straying too far from the results of the general acoustic model (340) would produce less accurate speech recognition results.

The speaker-dependent adaptation can be done using existing techniques for speaker-dependent acoustic model adaptation, except that the size reducing constraints on the speaker-dependent adaptation profile (350) discussed herein can be utilized, alone or in combination with each other. Such constraints for reducing the storage size of the speaker-dependent adaptation profile (350) will now be discussed.

III. Different Size Reducing Techniques for Speaker-Dependent Acoustic Models

A. Adaptive Matrix Reduction

In adaptive matrix reduction, the adaptive matrix has fewer weights than the adaptive layer into which the adaptive matrix is inserted. For example, this can be done where a layer of the general acoustic model (340) is decomposed into two matrices that are each smaller than an overall matrix for the layer, and the speaker-dependent acoustic model (335) includes the speaker-dependent adaptation profile (350) in the form of an adaptive matrix inserted as an even smaller matrix computationally between these two decomposed matrices.

Figure 5:
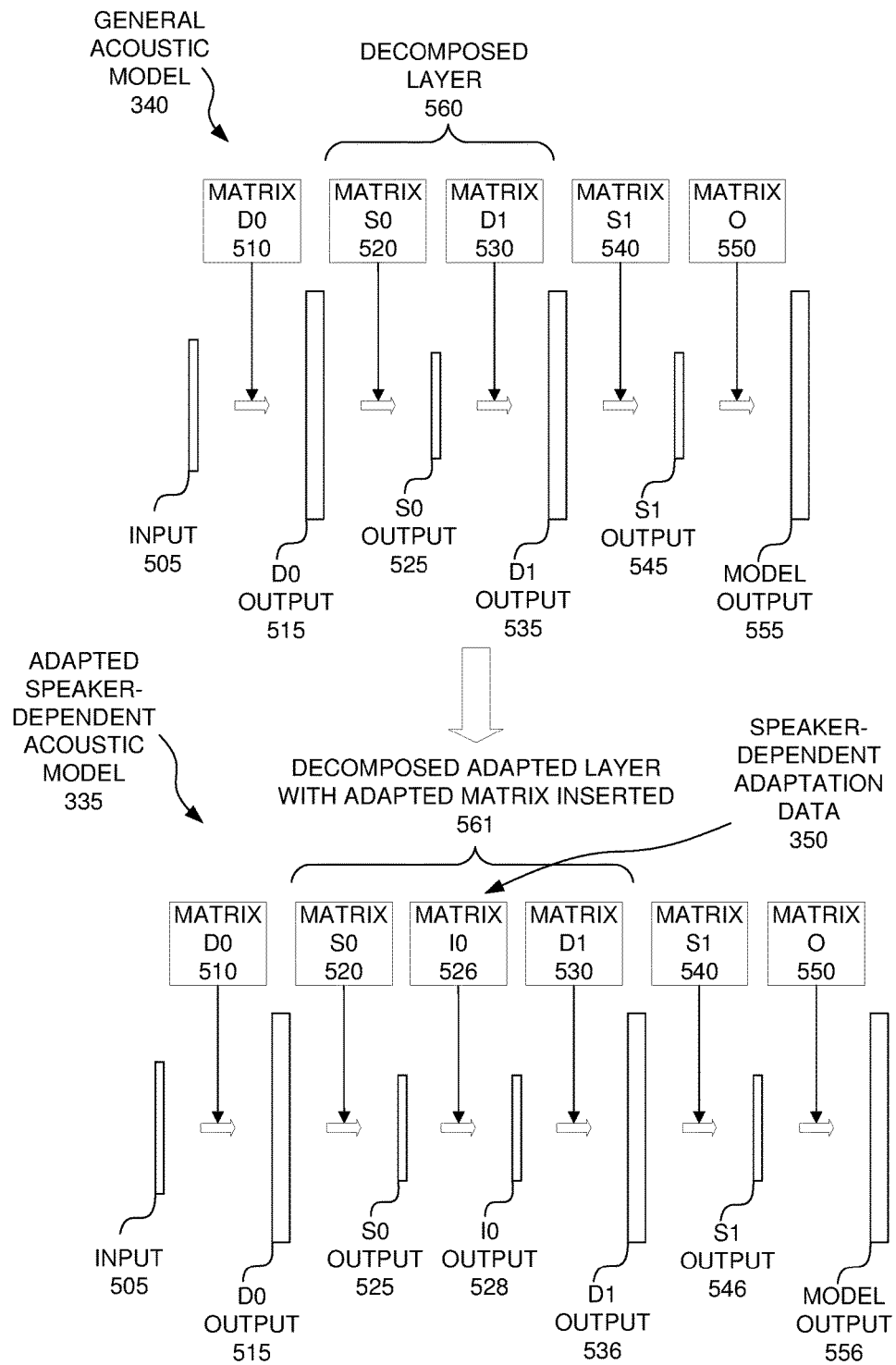
FIG. 5 is a schematic diagram illustrating operations on input speech features using a general acoustic model, insertion of an inserted speaker-dependent matrix into the model to form a speaker-dependent acoustic model, and operations on input speech features using a model that includes the speaker-dependent acoustic model.

An example of a technique including adaptive matrix reduction is illustrated in FIG. 5. The top portion of FIG. 5 illustrates processing of input (505) using a general acoustic model (340), which can be a vector of speech features representing speech audio energy values, such as the frequency band energy values for a period of time. The input (505) can be processed using an input layer matrix D0 (510) of the general acoustic model (340). Such processing can include non-linear matrix operations (e.g., multiplication operations combined with other nonlinear operations (tangent operations, etc.)), as has been done in prior speech recognition operations. Similar operations can be used in the other operations using the acoustic model matrices discussed below. The D0 output (515) can be operated upon using a matrix S0 (520), to produce an S0 output (525). The S0 output can be operated upon using the matrix D1 (530) to produce a D1 output (535), and the D1 output can be operated upon using a matrix S1 (540) to produce an S1 output (545). In turn, the S1 output can be operated upon by an output matrix O (550) to produce a model output (555), which is the output of the operation on the input (505) using the general acoustic model (340). In the general acoustic model (340), the matrix S0 (520) and the matrix D1 (530) can together from a decomposed layer (560). In such a layer, the matrix S0 (520) and the matrix D1 (530) can be decompositions of a larger layer matrix, such as where singular value decomposition is utilized.

The speaker-dependent acoustic model (335) includes speaker-dependent adaptation profile (350) in the form of a matrix I0 (526) inserted computationally between the matrices of the decomposed layer (560), to form a decomposed layer (561) with the adapted matrix (the matrix I0 (526) inserted). With this insertion, the S0 output (525) can be operated upon using the inserted matrix I0 (526) to produce an I0 output (528), which can be operated upon using the matrix D1 (530) to produce the speaker-dependent D1 output (536). That speaker-dependent D1 output (536) can be operated upon using the matrix S1 to produce a speaker-dependent S1 output (546). The speaker-dependent S1 output can be operated upon using the output matrix O (550) to produce the speaker-dependent model output (556). That speaker-dependent model output (556) can be processed, which can include comparing output with stored patterns for phonemes, to determine which phonemes are matches.

This inserted matrix I0 (526) can initially be an identity matrix, so that the model output would not initially be changed by the inserted matrix I0 (526). However, utilizing the acoustic model adaptation system (400) discussed above, the weights of the inserted matrix I0 (526) can be modified so that the operations using the combined general acoustic model (340) and speaker-dependent adaptation profile (350) operate in ways specific to the speaker corresponding to a user profile, thereby producing a model that yields more accurate speech recognition results for that speaker.

As discussed above, the inserted matrix I0 (526) can include a smaller number of weights than the number of weights that would have been used for the overall layer prior to decomposition. For example, the decomposed layer (560) may operate in place of a 2000 by 2000 weight matrix (with four million weights). One of the decomposed matrices may be a 100 by 2000 matrix, and the other may be a 2000 by 100 matrix. With such matrices, the inserted matrix I0 may be a 100 by 100 matrix (with ten thousand weights instead of four million weights). For each speaker, only the inserted 100 by 100 matrix may be stored as the speaker-dependent adaptation profile (350), rather than storing an entire multi-layered model, or even an entire full layer of such a model, for each speaker. When speech is being processed for a particular speaker, that speaker's speaker-dependent adaptation profile (350) (such as the 100 by 100 matrix) can be combined with at least part of the general acoustic model (340) to process the speech. This can produce a substantial savings in terms of storage utilized, especially when speaker-dependent adaptation profile (350) is stored for many such speakers (e.g., thousands, hundreds of thousands, or even millions of such speakers). Accordingly, this adaptive matrix reduction technique using an adaptive matrix inserted into a decomposed layer can be effective in reducing the numbers of weights that are stored, and the amount of computer system storage utilized.

B. Threshold Value Adaptation

In threshold value adaptation, a set of adapted layer weights in a speaker-dependent adaptive layer can be constrained, so that weights are set to a target value if the weights are greater than or equal to a threshold value. Alternatively, the set of weights may be constrained so that weights are set to a target value if the weights are less than or equal to a threshold value. For example, with a threshold of zero, all values may be constrained to be non-negative values. In such a technique, if weights of the speaker-dependent adaptation profile (350) would have been adapted to be negative values, those values can be set to a target value of zero. Similarly, if the threshold value is zero, the values may be constrained to be non-positive values, so that the if weights of the speaker-dependent adaptation profile (350) would have been adapted to be positive values, those values can be set to a target value of zero.

The threshold value may be different from the target value, and the threshold value may be set to a value other than zero. For example, the threshold value may be a small positive value, so that all negative values and all small positive values below or equal to the threshold are set to a target value of zero. Different values may be utilized for the threshold value, such as different small threshold values. The table below provides some examples of different threshold values that are used with a target value of zero in speaker-dependent adaptation, which also used adaptive matrix reduction, as discussed above. In the table, one column provides the threshold values, the next column provides the percentage of weights in the adaptive layer that were non-zero weights after the threshold value adaptation, and the last column provides the word error rate relative (WERR) gain over a baseline speaker-independent model (a measure of the percent improvement compared to the baseline model). Note that in the testing a baseline speaker-independent model provided a word error rate of 14.15%, and in this testing the best adapted model without the non-negative constraint had a WERR gain (error rate improvement) of 11.3%.

| Threshold | Non-zero weights [%] | Word error rate relative (WERR) gain [%] in testing |
|---|---|---|
| 0 | 72.1 | 11.17 |
| 0.0001 | 60.3 | 11.17 |
| 0.0002 | 46.5 | 10.84 |
| 0.0005 | 13.8 | 10.46 |
| 0.001 | 3.0 | 9.16 |
| 0.005 | 0.5 | 4.55 |

As can be seen, the threshold value adaptation can substantially reduce the number of values that are different from the target value (the non-zero values), while still retaining gains in word error rates that are comparable to speaker-specific adapted models without this size reducing technique. With many of the weight values in the adapted layer being the same as each other (such as with most such values being zero), such values can be greatly compressed using existing lossless data compression techniques.

C. Corner Area Adaptation

Figure 6:
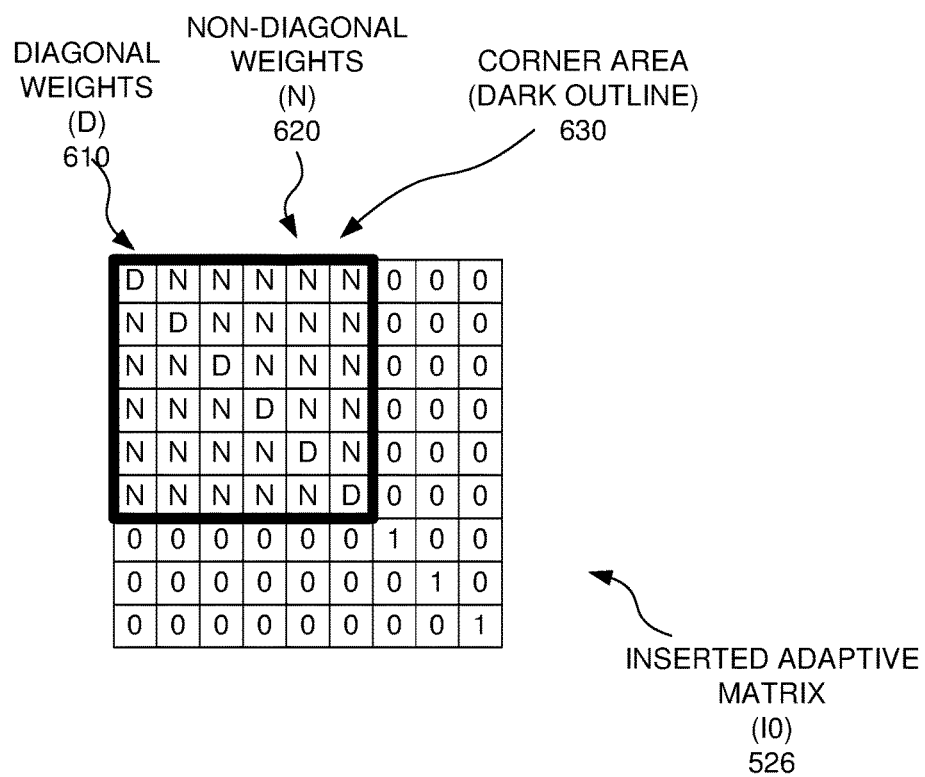
FIG. 6 is a schematic diagram of an example of an inserted adaptive matrix, illustrating diagonal weights, non-diagonal weights, and a corner area.

In corner area adaptation, a speaker-dependent adaptation is performed on weights in a top left corner matrix area of an adaptive matrix in the adaptive layer, without performing the speaker-dependent adaptation on other areas of the adaptive matrix outside of the corner matrix area. In some implementations, only weights in a rectangular top left corner area are adapted with the speaker-dependent adaptation, while no other weights in the matrix are adapted with that same speaker-dependent adaptation. In FIG. 6, an example of an inserted adaptive matrix I0 (526) is illustrated as a table. The corner area (630) is outlined with a dark line, the 0's represent non-diagonal values (values outside the main diagonal) that are not adapted and remain at zero (the same as in the initial identity matrix), and the 1's represent diagonal values (values in the main diagonal) that are not adapted and remain at 1 (the same as in the initial identity matrix). The D's represent diagonal weights (610) (weights along the main diagonal) that are adapted with the speaker-dependent adaptation, and the N's represent non-diagonal weights (620) (weights not along the main diagonal) that are adapted with the speaker-dependent adaptation (of course, some of the D's and N's may be set to zero or one as a result of adaptation and/or as a result of other size reducing techniques, such as threshold value adaptation). As can be seen, the corner area (630) includes the top left corner of the inserted adaptive matrix I0 (526), and in the illustrated example, the corner area (630) is a square shape. The corner area may be some other continuous or discontinuous shape that includes the top left corner. For example, the corner area may be a rectangle that includes the top left corner and extends horizontally along the entire top of the inserted adaptive matrix I0 (526). As another example, the corner area (630) may be a rectangle that includes the top left corner and extends vertically down along the entire left side of the inserted adaptive matrix I0 (526). As yet another example, the corner area (630) may include a square or rectangular corner area, along with additional diagonal values (such as a portion of or all diagonal values along the main diagonal). Indeed, the corner area (630) may include only the diagonal values extending along the main diagonal of the inserted adaptive matrix I0 (526).

D. Diagonal-Based Quantization

In diagonal-based quantization, a set of diagonal weights (610) of the adaptive layer can be constrained to a first range and quantized, while a set of non-diagonal weights (620) of the adaptive layer can be constrained to a second range and quantized, with the first range being different from the second range. The first and second ranges can be non-overlapping ranges. For example, the first range for the diagonal weights (610) may include a value of one, while the second range for the non-diagonal weights (620) may include a value of zero. For example, the weights in the diagonal may be in the range [1−x 1+x), and the non-diagonal weights may be in the range [−x x). In one implementation, each range can be quantized in 16 levels. For example, the non-diagonal weights may be quantized in 16 levels between [−0.08 0.07] at steps of 0.01. Similarly, the diagonal weights can be quantized in 16 levels between [0.92 1.07] at steps of 0.01. Thus, in this example, each such value may be stored in four bits (four-bit quantization). Thus, as compared to a typical sixteen-bit storage for parameters, this four-bit quantization can obtain a large reduction in storage size, such as a 75% reduction for storing the weight parameters of the adaptive layer. Even greater savings can be realized in comparison to thirty-two-bit storage for parameters.

It has been found that this diagonal-based quantization can produce effective results, because the inventors have found that many of the diagonal weights in particular implementations have values that are close to one, while many of the non-diagonal weights have values that are close to zero. Accordingly, the diagonal weights can be effectively quantized with values close to one, and the non-diagonal weights can be effectively quantized with values close to zero. As a result of different operations, other different value ranges of diagonal and non-diagonal weights may be produced in other implementations, which could make different ranges for diagonal and non-diagonal weights more useful.

As discussed herein, each of the size reducing techniques discussed above may be used separately, or in combination with each other. For example, if diagonal-based quantization is used with adaptive matrix reduction and corner area adaptation, then the diagonal weights (610) of the corner area (630) of the inserted adaptive matrix (526) can be quantized in a first range and the non-diagonal weights (620) of the corner area (630) of the inserted adaptive matrix (526) can be quantized in a second range. Similarly, if threshold value adaptation is used with adaptive matrix reduction and corner area adaptation, then the diagonal weights (610) and non-diagonal weights (620) of the corner area (630) can be constrained relative to threshold and target values as discussed above in the section on threshold value adaptation. As will be appreciated, other combinations of the size reducing techniques may be used in different scenarios to reduce the size of the speaker-dependent acoustic model data for each speaker.

IV. Overall Reduced Size Computerized Speech Model Speaker Adaptation Techniques Several reduced size computerized speech model speaker adaptation techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 7:
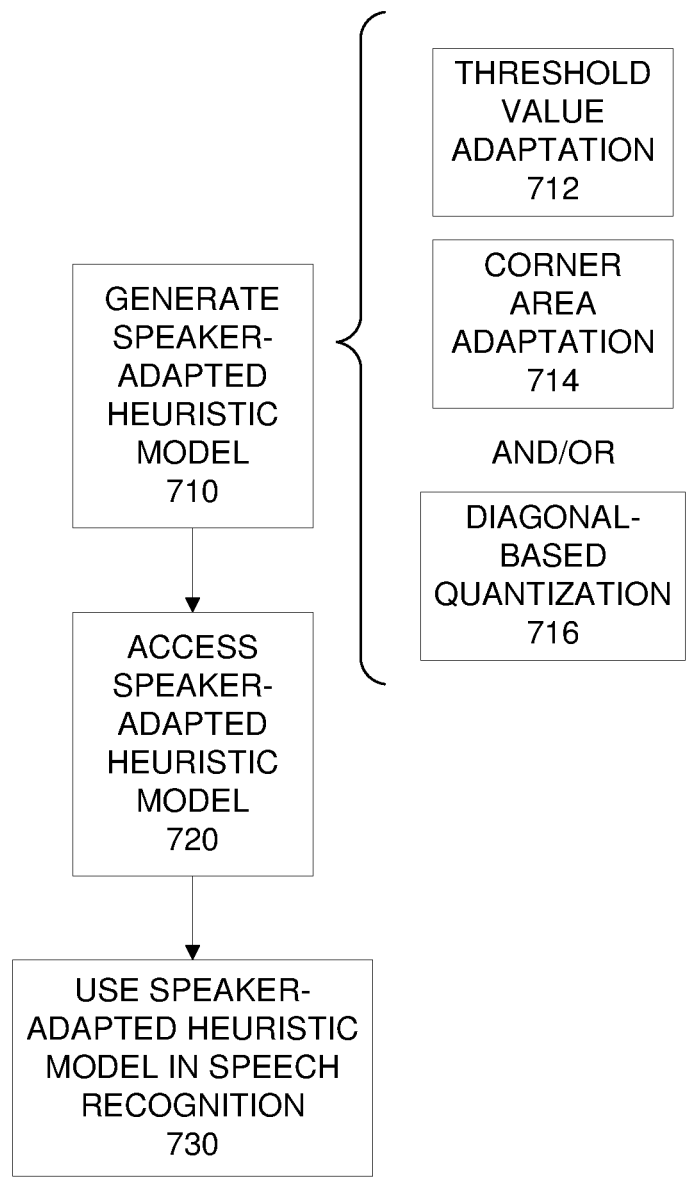
FIG. 7 is a flowchart of a reduced size computerized speech model speaker adaptation technique.

Referring to FIG. 7, a reduced size computerized speech model speaker adaptation technique will be described. The technique can include generating (710) a computer-readable speaker-adapted speech engine acoustic model. The acoustic model can include a deep neural network, and the generating of the acoustic model can include performing speaker-specific adaptation of one or more layers of the deep neural network to produce one or more adaptive layers comprising layer weights, with the speaker-specific adaptation of each adaptive layer of the one or more adaptive layers comprising a data size reduction technique of each adaptive layer. Thus, the adaptation and size reduction techniques may be performed on a single layer, or on multiple layers. The data size reduction technique can be threshold value adaptation (712), corner area adaptation (714), diagonal-based quantization (716), or a combination of the threshold value adaptation (712), the corner area adaptation (714), and the diagonal-based quantization (716). The combination of the threshold value adaptation (712), the corner area adaptation (714), and the diagonal-based quantization (716) can include any combination of two or more of these techniques. The overall technique of FIG. 7 can also include accessing (720) the speaker-adapted speech engine model, and using (730) the generated speaker-adapted speech engine model in performing speech recognition on computer-readable audio speech input via a computerized speech recognition engine. This technique may further include the features of the following paragraphs in any combination with each other.

In an example of the technique of FIG. 7, where the data size reduction technique includes the threshold value adaptation (712), the threshold value adaptation (712) can include constraining weights in the set of layer weights that are less than the threshold value to be the single target value. For example, the threshold value may be a value greater than zero (such as a small positive number) or equal to zero, and the target value may be zero. In the threshold value adaptation (712), the threshold value adaptation may alternatively include constraining weights in the set of layer weights that are greater than the threshold value to be the single target value, where the threshold value can be less than or equal to zero, and where the target value can be zero.

In an example of the technique of FIG. 7, where the data size reduction technique includes corner area adaptation (714), the top left corner area may be a continuous area.

In an example of the technique of FIG. 7, where the data size reduction technique includes diagonal-based quantization (716), the first range may include the value one, and the second range may include the value zero. Also, the first and second ranges may be non-overlapping ranges.

Also, the speaker-specific adaptation of FIG. 7 may include adaptive matrix reduction, wherein the adaptive matrix reduction includes the adaptive matrix having fewer weights than the adaptive layer.

Figure 8:
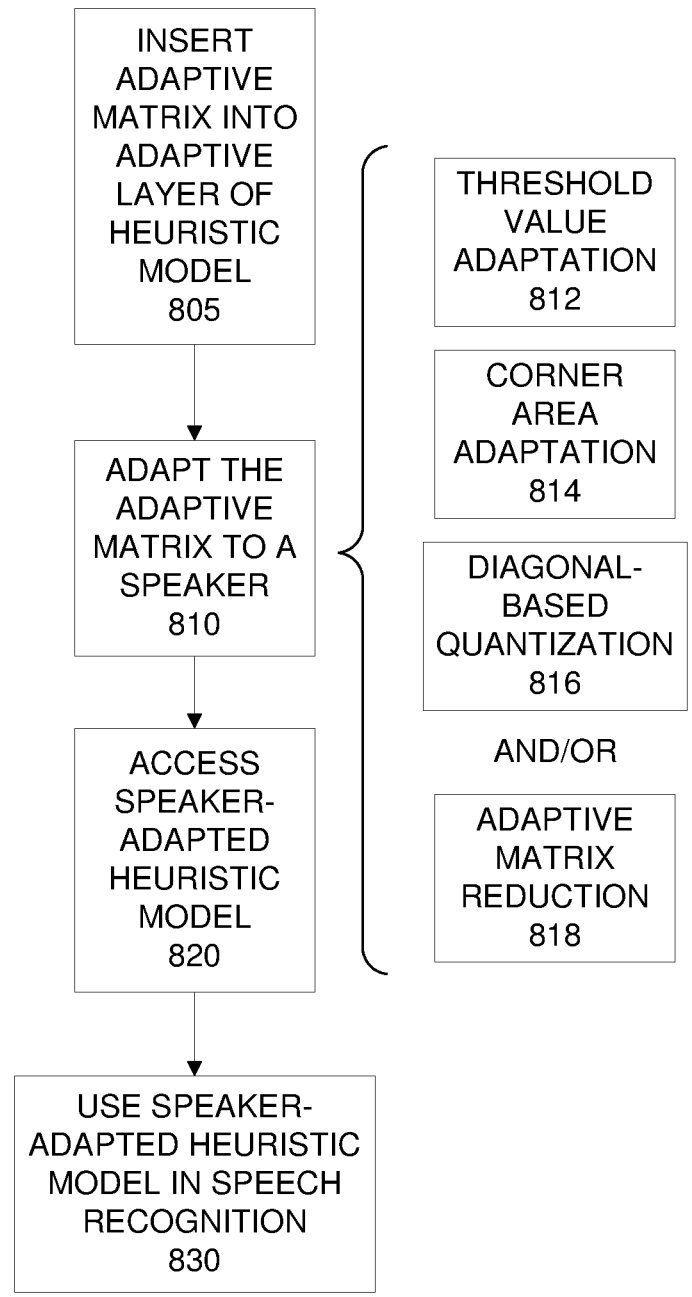
FIG. 8 is a flowchart of another reduced size computerized speech model speaker adaptation technique.

Referring now to FIG. 8, another reduced size computerized speech model speaker adaptation technique will be described. The technique of FIG. 8 can include inserting (805) an adaptive matrix into an adaptive layer of a computer-readable speech engine acoustic model. The technique can also include adapting (810) the adaptive matrix to a speaker, using training data to modify a set of weights in the adaptive matrix to generate a speaker-adapted speech engine acoustic model. The adapting (810) of the matrix can include performing speaker-specific adaptation of the adaptive matrix to produce adapted layer weights of the adaptive layer. The adapting of the adaptive matrix comprising a data size reduction technique. The size reduction technique can be either threshold value adaptation (812), corner area adaptation (814), diagonal-based quantization (816), adaptive matrix reduction (818), or a combination of one or more of the threshold value adaptation (812), the corner area adaptation (814), the diagonal-based quantization (816), and the adaptive matrix reduction (818). Indeed, in some implementations, the technique of FIG. 8 may include all of threshold value adaptation (812), corner area adaptation (814), diagonal-based quantization (816), and adaptive matrix reduction (818). The technique of FIG. 8 can further include accessing (820) the speaker-adapted speech engine acoustic model. The FIG. 8 technique can further include using (830) the speaker-adapted speech engine acoustic model in performing speech recognition on computer-readable audio speech input via a computerized speech recognition engine. This technique of FIG. 8 can be used with one or more of the features in the paragraphs below.

The adaptive layer can be an intermediate model layer.

The adapting of the adaptive matrix can include modifying the adaptive matrix from an identity matrix to a resulting speaker-specific adapted matrix, such as by modifying the adaptive matrix responsive to processing of speaker-specific training data.

In a situation where the data size reduction technique includes the adaptive matrix reduction, the adaptive layer can include a first matrix and a second matrix. Also, the adaptive matrix can be inserted computationally between the first matrix and the second matrix. The first matrix and the second matrix can be speaker-independent matrices with speaker-independent weights (such as weights that are tailored to a particular dialect, but not to a particular speaker).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
    at least one processor; and
    memory comprising instructions stored thereon that when executed by at least one processor cause at least one processor to perform acts comprising:
        generating a computer-readable speaker-adapted speech engine acoustic model, with the acoustic model comprising a deep neural network, and with the generating of the acoustic model comprising performing speaker-specific adaptation of a layer of the deep neural network to produce an adaptive layer comprising layer weights, with the speaker-specific adaptation of the adaptive layer comprising a data size reduction technique of the adaptive layer that is either:
            threshold value adaptation, with the threshold value adaptation comprising comparing a set of adapted layer weights in the adaptive layer to a predetermined threshold value and either constraining weights in the set of layer weights that are less than the threshold value to be a single target value, or constraining weights in the set of layer weights that are greater than the threshold value to be the single target value, wherein the threshold value adaptation comprises a weight constraining operation that is either: constraining weights in the set of layer weights that are less than the threshold value to be the single target value, wherein the threshold value is greater than or equal to zero, and wherein the target value is zero; or constraining weights in the set of layer weights that are greater than the threshold value to be the single target value, wherein the threshold value is less than or equal to zero, and wherein the target value is zero;
            diagonal-based quantization, wherein the diagonal-based quantization comprises constraining to a first range and quantizing a set of diagonal weights of the adaptive layer, and constraining to a second range and quantizing a set of non-diagonal weights of the adaptive layer, with the first range being different from the second range; or
            a combination of the threshold value adaptation and the diagonal-based quantization;
        accessing the speaker-adapted speech engine model; and
        using the generated speaker-adapted speech engine model in performing speech recognition on computer-readable audio speech input via a computerized speech recognition engine.

2. The computer system of claim 1, wherein the data size reduction technique comprises the threshold value adaptation.

3. The computer system of claim 2, wherein the threshold value adaptation comprises constraining weights in the set of layer weights that are less than the threshold value to be the single target value, wherein the threshold value is greater than or equal to zero, and wherein the target value is zero.

4. The computer system of claim 3, wherein the threshold value is greater than zero.

5. The computer system of claim 3, wherein the threshold value is zero.

6. The computer system of claim 2, wherein the threshold value adaptation comprises constraining weights in the set of layer weights that are greater than the threshold value to be the single target value, wherein the threshold value is less than or equal to zero, and wherein the target value is zero.

7. The computer system of claim 1, wherein the adaptation of the adaptive layer comprises corner area adaptation, wherein the corner area adaptation comprises performing a speaker-dependent adaptation on weights in a top left corner matrix area of an adaptive matrix in the adaptive layer, without performing the speaker-dependent adaptation on other areas of the adaptive matrix outside of the corner matrix area.

8. The computer system of claim 1, wherein the data size reduction technique comprises the diagonal-based quantization.

9. The computer system of claim 8, wherein the first range includes a value of one and the second range includes a value of zero.

10. The computer system of claim 1, wherein the data size reduction technique comprises a combination of corner area adaptation and the diagonal-based quantization, wherein the corner area adaptation comprises performing a speaker-dependent adaptation on weights in a top left corner matrix area of an adaptive matrix in the adaptive layer, without performing the speaker-dependent adaptation on other areas of the adaptive matrix outside of the corner matrix area.

11. The computer system of claim 1, wherein the speaker-specific adaptation comprises adaptive matrix reduction, wherein the adaptive matrix reduction comprises an adaptive matrix in the adaptive layer having fewer weights than the adaptive layer.

12. The computer system of claim 1, wherein the generating of the acoustic model comprises performing speaker-specific adaptation of multiple layers of the deep neural network to produce multiple adaptive layers, including the adaptive layer.

13. A computer-implemented method of adapting a speech engine acoustic model, comprising:
    inserting an adaptive matrix into an adaptive layer of a computer-readable speech engine acoustic model;
    adapting the adaptive matrix to a speaker, using training data to modify a set of weights in the adaptive matrix to generate a speaker-adapted speech engine acoustic model, with the adapting of the adaptive matrix comprising performing speaker-specific adaptation of the adaptive matrix to produce adapted layer weights of the adaptive layer, with the adapting of the adaptive matrix comprising a data size reduction technique that is either:
    threshold value adaptation, with the threshold value adaptation comprising comparing a set of adapted layer weights in the adaptive layer to a predetermined threshold value and either constraining weights in the set of layer weights that are less than the threshold value to be a single target value, or constraining weights in the set of layer weights that are greater than the threshold value to be the single target value, wherein the threshold value adaptation comprises a weight constraining operation that is either: constraining weights in the set of layer weights that are less than the threshold value to be the single target value, wherein the threshold value is greater than or equal to zero, and wherein the target value is zero; or constraining weights in the set of layer weights that are greater than the threshold value to be the single target value, wherein the threshold value is less than or equal to zero, and wherein the target value is zero;
    diagonal-based quantization, wherein the diagonal-based quantization comprises constraining to a first range and quantizing a set of diagonal weights of the adaptive layer, and constraining to a second range and quantizing a set of non-diagonal weights of the adaptive layer, with the first range being different from the second range; or
    a combination of the threshold value adaptation and the diagonal-based quantization;
accessing the speaker-adapted speech engine acoustic model; and
using the speaker-adapted speech engine acoustic model in performing speech recognition on computer-readable audio speech input via a computerized speech recognition engine.

14. The method of claim 13, wherein the adapting of the adaptive matrix further comprises adaptive matrix reduction, wherein the adaptive matrix reduction comprises the adaptive matrix having fewer weights than the adaptive layer, and wherein the adaptive layer is an intermediate model layer.

15. The method of claim 13, wherein the adapting of the adaptive matrix further comprises adaptive matrix reduction, wherein the adaptive matrix reduction comprises the adaptive matrix having fewer weights than the adaptive layer, the adapting of the adaptive matrix comprises modifying the adaptive matrix from an identity matrix to a resulting speaker-specific adapted matrix.

16. The method of claim 13, wherein the data size reduction technique comprises the combination of the threshold value adaptation and the diagonal-based quantization.

17. The method of claim 13, wherein the adapting of the adaptive matrix further comprises adaptive matrix reduction, wherein the adaptive matrix reduction comprises the adaptive matrix having fewer weights than the adaptive layer, and wherein the adaptive layer comprises a first matrix and a second matrix, and wherein the adaptive matrix is inserted computationally between the first matrix and the second matrix.

18. The method of claim 13, wherein the data size reduction technique comprises the diagonal-based quantization.

19. One or more computer-readable memory having computer-executable instructions embodied thereon that, when executed by at least one processor, cause at least one processor to perform acts comprising:
    inserting an adaptive matrix into an adaptive layer of a computer-readable speech engine acoustic model;
    adapting the adaptive matrix to a speaker using training data to modify a set of weights in the adaptive matrix to generate a speaker-adapted speech engine acoustic model, with the adapting of the adaptive matrix comprising performing speaker-specific adaptation of the adaptive matrix to produce adapted layer weights of the adaptive layer, with the adapting of the adaptive matrix comprising a data size reduction technique that is either:
        threshold value adaptation, with the threshold value adaptation comprising comparing a set of adapted layer weights in the adaptive layer to a predetermined threshold value and either constraining weights in the set of layer weights that are less than the threshold value to be a single target value, or constraining weights in the set of layer weights that are greater than the threshold value to be the single target value, wherein the threshold value adaptation comprises a weight constraining operation that is either: constraining weights in the set of layer weights that are less than the threshold value to be the single target value, wherein the threshold value is greater than or equal to zero, and wherein the target value is zero; or constraining weights in the set of layer weights that are greater than the threshold value to be the single target value, wherein the threshold value is less than or equal to zero, and wherein the target value is zero;
        diagonal-based quantization, wherein the diagonal-based quantization comprises constraining to a first range and quantizing a set of diagonal weights of the adaptive layer, and constraining to a second range and quantizing a set of non-diagonal weights of the adaptive layer, with the first range being different from the second range; or
        a combination of the threshold value adaptation and the diagonal-based quantization;
    accessing the speaker-adapted speech engine model; and
    using the generated speaker-adapted speech engine model in performing speech recognition on computer-readable audio speech input via a computerized speech recognition engine.

20. The one or more computer-readable memory of claim 19, wherein the adapting of the adaptive matrix comprises adaptive matrix reduction, wherein the adaptive matrix reduction comprises the adaptive matrix having fewer weights than the adaptive layer, with the adaptive layer being decomposed into a first matrix and a second matrix, and with the adaptive matrix being included in the adaptive layer with the first matrix and the second matrix, wherein the adaptive matrix has fewer weights than the first matrix and fewer weights than the second matrix.

* * * * *